United States Patent [19]
Schaeffer et al.

[11] Patent Number: 5,598,968
[45] Date of Patent: Feb. 4, 1997

[54] METHOD FOR PREVENTING RECRYSTALLIZATION AFTER COLD WORKING A SUPERALLOY ARTICLE

[75] Inventors: Jon C. Schaeffer, Milford; Andi K. Bartz, Middletown; Paul J. Fink, Maineville, all of Ohio

[73] Assignee: General Electric Company, Cincinnati, Ohio

[21] Appl. No.: 560,780

[22] Filed: Nov. 21, 1995

[51] Int. Cl.⁶ .................... B23K 1/20; C23C 8/34
[52] U.S. Cl. .................. 228/262.31; 228/203; 228/205; 148/528; 148/534; 29/889.21
[58] Field of Search ................. 228/203, 205, 228/262.31; 148/528, 534, 676; 29/889.1, 889.21

[56] References Cited

U.S. PATENT DOCUMENTS

| | | | |
|---|---|---|---|
| 2,014,612 | 9/1935 | Borton | 29/156.7 |
| 2,197,039 | 4/1940 | Gottlieb | 148/4 |
| 2,297,357 | 9/1942 | Kelley | 148/4 |
| 3,197,858 | 8/1965 | Feduska et al. | 29/494 |
| 3,632,319 | 1/1972 | Hoppin et al. | 29/487 |
| 3,696,500 | 10/1972 | Tarshis et al. | 29/487 |
| 3,994,655 | 11/1976 | Setzer et al. | 428/654 |
| 4,013,487 | 3/1977 | Ramqvist | 148/16.5 |
| 4,208,222 | 6/1980 | Barlow et al. | 148/6 |
| 4,249,963 | 2/1981 | Young | 148/16 |
| 4,253,884 | 3/1981 | Maurer et al. | 148/13.1 |
| 4,253,885 | 3/1981 | Maurer et al. | 148/13.1 |
| 4,427,461 | 1/1984 | Kindlimann | 148/16.6 |
| 4,726,508 | 2/1988 | Carpenter | 228/263.13 |
| 4,973,366 | 11/1990 | Yasuda et al. | 148/11.5 N |
| 5,221,039 | 6/1993 | Jung et al. | 228/195 |
| 5,240,491 | 8/1993 | Budinger et al. | 75/255 |
| 5,334,263 | 8/1994 | Schaeffer | 148/217 |

OTHER PUBLICATIONS

Metals Handbook Ninth Edition, vol. 6, pp. 1001–1021, copyright 1983.

*Primary Examiner*—Samuel M. Heinrich
*Attorney, Agent, or Firm*—Andrew C. Hess; David L. Narciso

[57] ABSTRACT

A process is provided for manufacturing and repairing components, and particularly superalloy components such as gas turbine engine components. The invention entails forming precipitates in a surface of the article that has been cold worked as a result of surface machining, cleaning, handling, etc. The precipitates serve to prevent recrystallization and formation of a secondary reaction zone in the cold worked surface of the superalloy when subsequently exposed to temperatures approaching the solution temperature of the superalloy, such that the microstructure and mechanical properties of the superalloy article are preserved.

20 Claims, 3 Drawing Sheets

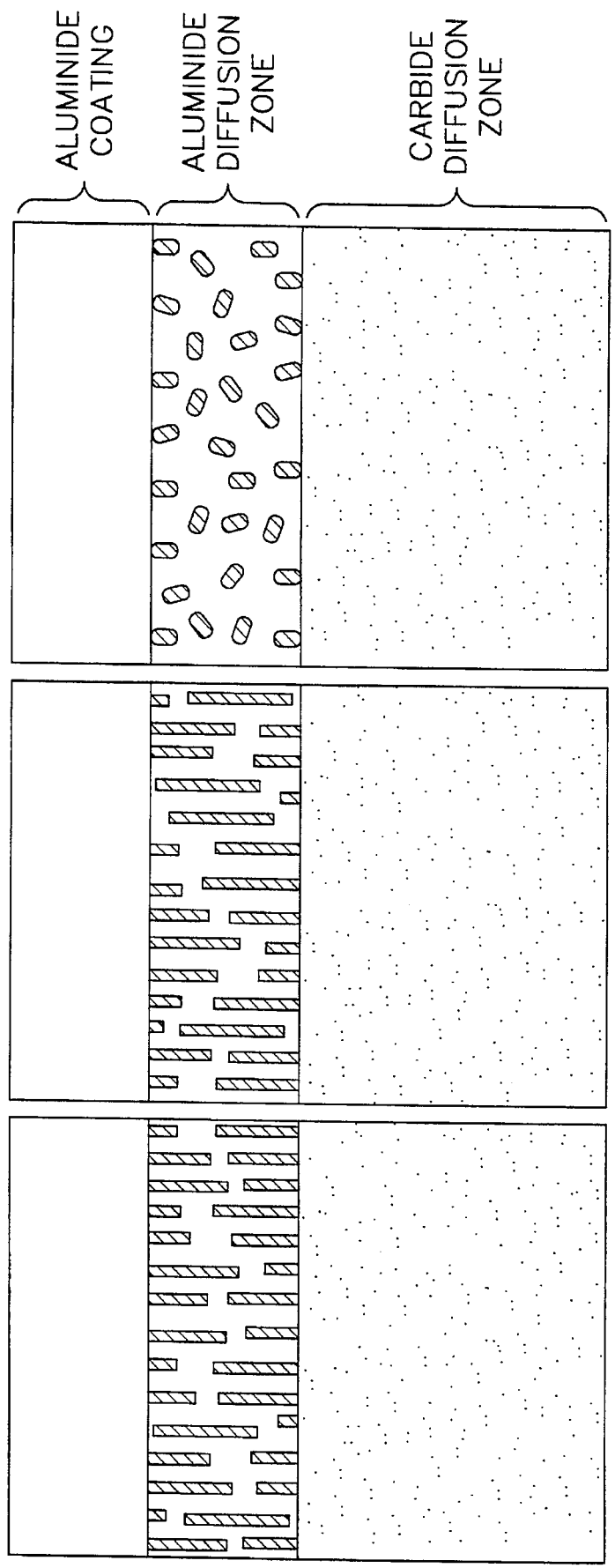

METHOD FOR PREVENTING RECRYSTALLIZATION AFTER COLD WORKING A SUPERALLOY ARTICLE

The present invention relates to a method for brazing high temperature components. More particularly, this invention relates to a method for brazing or repairing a superalloy component at temperatures near the solution temperature of the superalloy so as to prevent the occurrence of recrystallization and the formation of a secondary reaction zone in the surface of the component, thereby maintaining the desired mechanical properties of the superalloy and enabling the use of high temperature braze alloys that promote the mechanical and fatigue resistance properties of the component.

BACKGROUND OF THE INVENTION

High temperature superalloys such as cobalt and nickel-based superalloys are widely used to manufacture certain components of gas turbine engines, including combustors and turbine vanes and blades. While high temperature superalloy components are often formed by casting, circumstances exist where such components are preferably or required to be fabricated by brazing. For example, components having complex configurations can be more readily fabricated by brazing or welding separate subcomponents together, such as the turbine blades and vanes of a gas turbine engine. Therefore, it is typically more practical and cost effective to fabricate complex components by brazing or welding rather than casting the component as a single member.

In addition, brazing and welding are widely used as a method for repairing cracks and other surface discontinuities that result from thermal cycling or foreign object impact of a superalloy component. Because the cost of components formed from high temperature cobalt and nickel-based superalloys is relatively high, repairing these components is typically more desirable than replacing them when they become damaged.

In the prior art, brazing methods for superalloy components have included vacuum brazing techniques using alloy powders or mixtures of powders. With the advent of higher strength and more highly alloyed superalloys, improved braze materials and processes have been required to take full benefit of the strength of such superalloys. Because the mechanical properties of a braze material generally increase with higher melting temperatures, a significant effort has been directed toward formulating braze materials whose melting points approach that of superalloys.

To promote a high quality braze joint during component fabrication or repair, the surfaces to be joined must be cleaned with the use of abrasive media to remove oxides and contamination that would otherwise reduce the strength of the bond. This mode of cleaning inherently introduces cold work into the surface of the superalloy, as do numerous other processes conventionally performed on superalloy articles, such as welding, stripping and recoating, grinding and milling. Even handling of an article can result in cold working of the article in the form of localized surface deformation. Any such surface work will cause recrystallization in the surface of the superalloy article if the surface is later subjected to a sufficiently high temperature, such as during brazing or welding. As is known in the art, recrystallization substantially reduces the mechanical properties of superalloys, including thermal fatigue resistance, and provides boundaries where cracking can occur. These adverse effects are particular deleterious for single crystal (SX) and directionally-solidified (DS) components used in gas turbine engines, such as high pressure turbine vanes and blades and combustors.

Therefore, the optimal brazing temperature for brazing a superalloy component is dictated in part by two conflicting considerations. On one hand, braze materials whose melting temperatures approach that of the superalloy provide stronger brazements. However, the temperature at which brazing can be performed is limited by the temperature at which recrystallization will occur in the surface of a superalloy as a result of its surface being cold worked during machining, cleaning and handling. With nickel and cobalt-base superalloys, cellular recrystallization can be of concern at brazing temperatures of as low as about 930° C. (about 1700° F.), imposing a significant limitation on the maximum melting temperature of the braze material used to braze a superalloy article, whose melting temperature often exceeds 1300° C.

Accordingly, it can be appreciated that prevention of recrystallization during heating of a superalloy component would be highly desirable. In particular, such a capability would enable a higher temperature brazing operation using braze materials with melting temperatures that more closely approach that of the superalloy from which the component is formed. Finally, such a capability would be particularly advantageous with single crystal and directionally solidified gas turbine engine components, whose mechanical properties are predominantly dependent on their microstructures.

SUMMARY OF THE INVENTION

It is an object of this invention to provide a process that prevents detrimental surface recrystallization of a superalloy article when exposed to elevated temperatures following a manufacturing process that introduces cold work or surface deformation into the article, such that degradation of the mechanical properties of the article is avoided.

It is a further object of this invention that such a process enables high temperature braze materials to be effectively used when brazing one or more articles formed from a superalloy.

It is another object of this invention that such a process prevents surface recrystallization without adversely affecting the environmental and mechanical properties of the superalloy article.

It is yet another object of this invention that such a process is compatible with prior art processing techniques for superalloy articles.

In accordance with a preferred embodiment of this invention, these and other objects and advantages are accomplished as follows.

According to the present invention, there is provided a process for fabricating and repairing superalloy articles, particularly articles formed from nickel-base and cobalt-base superalloys such as gas turbine engine components. The process of this invention allows conventional manufacturing processes to be employed when preparing a superalloy article for brazing, yet prevents recrystallization in the surface of the article though a cold worked surface region is present as a result of the manufacturing processes. Prevention of recrystallization is uniquely achieved by this invention through the formation of precipitates at the surface of the article, in which the precipitates resist the motion of incoherent grain boundaries that are necessary for surface recrystallization to occur within the cold worked region.

The process of this invention generally encompasses conventional manufacturing operations, including machining, cleaning and handling of a superalloy article, such as abrasive cleaning techniques employed to clean the surface of a superalloy article such that contaminants and oxides are removed from the surface prior to brazing. Each of the above operations tends to introduce cold work to a determinable depth into the surface of the article. According to this invention, recrystallization-preventing precipitates such as carbides, borides, nitrides and oxides are formed in the surface of the article, either before or after the operations that induce cold working. Importantly, the precipitates are formed to be present to a depth at least equal to the cold work depth in the article, to ensure that recrystallization will not occur in the cold worked region at the articles surface.

As a result of the above, the article can be subsequently heated to a temperature above the recrystallization temperature of the superalloy, such as during fabrication or repair of the article by brazing in which a high temperature braze material is used. Specifically, brazing can be conducted at a temperature that, if not for the presence of the precipitates, would result in recrystallization of the cold worked surface region of the article.

The ability to prevent recrystallization is particularly desirable for articles having microstructures that are critical to their mechanical properties, such as gas turbine engine components formed to have single crystal or directionally-solidified microstructures. Previously, surface recrystallization would result from heating a cold worked superalloy article to temperatures of as little as about 930° C., such that a significant limitation was imposed on the maximum melting temperature of the braze material used to braze a superalloy article. Consequently, the full capacity of a superalloy could not be exploited in the past because of the relatively low melting temperature of the braze material, corresponding to reduced creep resistance. However, in accordance with this invention, recrystallization can be prevented at the superalloys solution temperature, thereby greatly increasing the maximum allowable brazing temperature.

Accordingly, another significant advantage of this invention is the ability to use braze materials having melting temperatures that more nearly approach that of the superalloy composition of the article. This advantage is possible because the microstructure of the article is prevented from recrystallizing at the higher temperatures required to melt and flow such braze materials. Removing this limitation by preventing recrystallization enables the use of higher temperature braze materials, yielding brazed articles with improved high temperature properties and that better exploit a superalloys capabilities.

In addition to the above, a significant aspect of this invention is that the above advantages are achieved without adversely affecting mechanical or environmental properties of the superalloy article. The precipitates serve only to inhibit recrystallization while leaving undisturbed the interior areas of the superalloy article where recrystallization does not pose a problem at the desired brazing temperatures.

Yet another significant aspect of this invention is that it can be incorporated with other processes practiced in the art, such as the use of aluminide coatings for preventing environmental corrosion and thermal barrier coatings for thermal protection. As a result, an article fabricated or repaired in accordance with this invention is capable of being further processed in order to enhance the environmental properties of the article over a wide range of temperatures.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIGS. 2A through 2C represent micrographs comparing three aluminide-coated superalloy turbine blades that were carburized, heavily cold worked, and coated in accordance with this invention prior to undergoing high temperature soaks for about one hour at about 1302°, 1316° and 1329° C., respectively.

DETAILED DESCRIPTION OF THE INVENTION

Figure 1B:
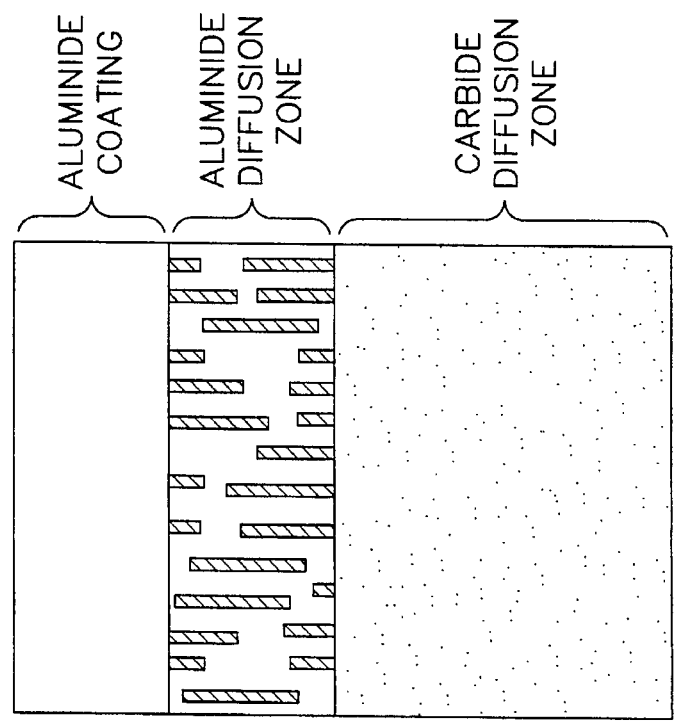
FIGS. 1A and 1B represent micrographs comparing two aluminide-coated superalloy turbine blades, one of which was carburized in accordance with this invention prior to undergoing a high temperature soak at about 1090° C. for about 200 hours.

The present invention provides a method that is suitable for fabricating and repairing components that must operate at elevated temperatures, and particularly superalloy components of gas turbine engines such as stator vanes and turbine blades of high pressure turbines and combustors. For example, turbine blades used in a gas turbine engine will often be individually cast as a single crystal or directionally-solidified casting to promote the high temperature properties of the blade, and then later brazed to a turbine disk, band or airfoil tip cap to form a brazed assembly. The process of this invention is particularly suited for fabricating such components and repairing voids and cracks in such components, so as to promote their high temperature properties. While the present invention and its advantages are applicable to a wide variety of high temperature materials, the following discussion will be directed to nickel and cobalt-base superalloys of the type used in aerospace applications, such as those discussed above, and particularly to superalloys having a high rhenium content and are therefore prone to formation of a detrimental secondary reaction zone (SRZ).

As is conventional with brazing processes for joining two or more subcomponents to form a brazed superalloy article or for repairing the surface of a superalloy article, it is necessary to thoroughly clean the surface to be brazed. The purpose of cleaning the brazement area before brazing is to remove undesirable contaminants and oxides that would interfere with the braze materials ability to adhere to the surface of the article. While various methods are suitable for adequately cleaning the surface area where a braze joint is to be formed, the preferred technique in the art is to grit blast the surface with an abrasive media. As is known in the art, suitable media include alumina and silica, and may have a particle size of about 60 to about 240 micrometers. In practice, an effective cleaning action can be achieved by propelling an abrasive media under air pressure of about 30 to about 100 psi, though other pressures and propulsion techniques can be employed.

Though the cleaning of the superalloy article enables the braze material to better adhere to the article, thereby producing a stronger bond, the process of cleaning the surface introduces a significant amount of surface work into the superalloy, and is in addition to surface work already present in the superalloy due to prior manufacturing processes such as machining, grinding and handling. Regardless of the manner in which it was formed, any cold worked region in the surface of the article is detrimental to a superalloy article that must subsequently be heated to a temperature of about 930° C. (about 1700° F.) or more, because recrystallization tends to occur due to internal stresses created by cold working. This invention serves to prevent recrystallization in the surface of a superalloy article at the solution temperature of its superalloy, and thereby enables the superalloy to be exposed to temperatures substantially higher than would otherwise be permitted by the presence of a cold worked surface. As a result, braze materials having a substantially higher melting temperature than otherwise permitted by the cold worked superalloy can be used in a subsequent brazing operation. Because a higher melting temperature corresponds to greater creep resistance, the resulting brazed article is characterized by enhanced high temperature mechanical properties.

In particular, this invention involves the formation of submicron precipitates within the surface of a superalloy article corresponding to the cold worked surface region of the article. In particular, it has been unexpectedly determined that the presence of a large volume fraction of submicron precipitates in the cold worked surface region of a superalloy article serves to resist the motion of incoherent grain boundaries necessary for recrystallization to occur. Several different precipitates may be used to prevent recrystallization, including carbides, borides, nitrides and oxides, with a preferred method of this invention utilizing conventional carburization techniques to produce carbide precipitates in the surface of a superalloy article. While the use of carburization to prevent the formation of deleterious topologically-close-packed (TCP) phases in a surface of a superalloy article is reported in U.S. Pat. No. 5,334,263 to Schaeffer, the ability to prevent recrystallization through the introduction of precipitates into the surface was unexpected. In particular, the teachings of Schaeffer were directed to a detrimental interaction between aluminide coatings and superalloys that produces TCP phases in the subsurface of the superalloys, resulting in reduced mechanical properties. According to Schaeffer, a carbon layer is formed and diffused into a surface of a superalloy article to serve as a barrier between a subsequently-deposited aluminide coating and the superalloy to prevent interaction between the two. However, the formation of TCP phases in a superalloy article is not related to the recrystallization mechanism of interest here. As a result, the ability for carbon precipitates to prevent recrystallization within the surface of a superalloy was not known, predicted or even contemplated by Schaeffer as an additional step in the heating or brazing of superalloy components, nor could it be predicted based on the teachings of Schaeffer.

According to this invention, precipitates can be formed within the cold worked region of a superalloy component using any suitable method known in the art. With reference to the preferred carburization method, a superalloy component can be carburized using any method that achieves sufficient carburization extending the necessary depth into the superalloy to prevent recrystallization during brazing. For example, carburization can be carried out in a vacuum atmosphere of between about 200 and about 760 torr with a ratio of methane to hydrogen of about ten to one, and at a temperature of about 980° C. to about 1090° C. (about 1900° F. to about 2100° F.), with a suitable carburizing treatment involving exposure to a temperature of about 1080° C. (about 1975° F.) for a duration of about one hour. Under the above conditions, diffusion of elemental carbon results in the formation of carbide precipitates at a rate whose depth of precipitation proceeds at about 36 micrometers/hour (about 1.4 mils/hour) into the surface of a nickel or cobalt-base superalloy. Alternatively, an atmosphere of metallo-organics or a carbon monoxide-carbon dioxide mixture could be used to carburize the surface of a superalloy. In addition, a pack carburizing technique could be alternatively employed, though heating and cooling durations would necessarily be longer than that possible with gaseous treatments.

Figure 3A:
FIGS. 3A and 3B are two alternative process flow charts that can be adopted to implement this invention.
Figure 3B:
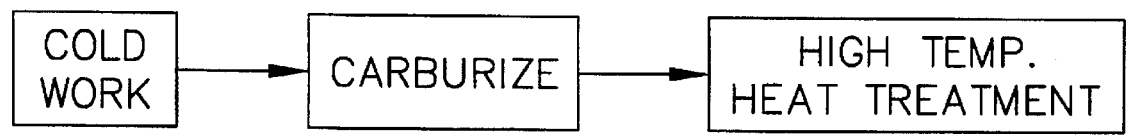

While the temperature and duration for the precipitation process may vary from the above, it is an important aspect of this invention that the resulting precipitates extend sufficiently deep to fully infiltrate the region in the surface of the superalloy component that will or has already undergone cold working. As represented in FIG. 3A, carburizing may be performed prior to the step or steps that are the cause of cold working. In contrast, FIG. 3B is illustrative of the processing flow in which cold working of the article occurs prior to carburization, which is typical where a superalloy component is grit blasted in preparation for brazing. It is known that grit blasting can cause cold working to a depth of about 25 micrometers (about 0.001 inch) or more in a components surface, necessitating that the surface treatment be carried out for a duration sufficient to result in the presence of precipitates to at least the same depth, and possibly deeper. Consequently, implementation of the present invention entails predicting or ascertaining the cold work depth in a component prior to carburizing, or later sectioning the component to evaluate the adequacy of the carburizing process.

Following formation of the precipitates, the component is preferably cleaned of soot or other particulate matter that might remain on the surface of the component. An air spray or nylon brush is suitable for this purpose. Finally, the superalloy component can be heated up to the superalloys solution temperature without concern for recrystallization. For the brazing example, a braze material can be provided and used in the form of a solid, a slurry, a presintered preform, or a plasticized tape, each of which may be a mixture of fibers and a powdered bonding alloy. A preferred form of the braze material will generally depend on the particular component to be brazed, and whether the brazing operation is for the repair of the component or to form a brazed assembly. Because the precipitates within the cold worked surface of the component prevent recrystallization, the braze material can be selected on the basis of having mechanical properties and a melting temperature near that of the superalloy composition of the component to be brazed.

In addition to the benefits noted above, a significant advantage of this invention is that the presence of the preferred precipitates in the surface of a superalloy component does not have an adverse effect on the mechanical and environmental properties of the superalloy. To evaluate this aspect of the invention, tests were performed on superalloy specimens formed from nickel-base superalloys coated with an aluminide coating in accordance with known prior art techniques. The superalloys evaluated were Rene N6 and Rene 162 having the following nominal compositions in weight percent:

|  | Rene N6 | Rene 162 |
| --- | --- | --- |
| Cobalt | 12.5 | 12.5 |
| Chromium | 4.5 | 4.5 |
| Molybdenum | 1.1 | — |
| Tungsten | 5.75 | 5.75 |
| Rhenium | 5.35 | 6.25 |
| Tantalum | 7.5 | 7.0 |
| Aluminum | 6.0 | 6.25 |
| Hafnium | 0.15 | 0.15 |
| Carbon | 0.05 | 0.05 |
| Boron | 0.004 | 0.004 |
| Yttrium | 0.01 | 0.01 |

Balance of nickel and minor amounts of trace elements. Notably, both Rene N6 and Rene 162 have high rhenium contents of five weight percent or more, and are therefore susceptible to the formation of a deleterious secondary reaction zone (SRZ) when coated with an environmentally protective aluminum-based coating and then exposed to temperatures approaching the solution temperature of the alloy for long durations.

For the following mechanical and environmental tests, the surfaces of the samples were heavily grit blasted to a degree sufficient to remove surface material and cold work the surface to a depth of at least about 25 micrometers. Some of the samples were then carburized in accordance with the manner described above, with submicron carbides being precipitated to a depth of greater than that of the cold work depth, i.e., at least 25 micrometers. With each of the alloys tested, a large volume fraction of precipitates was readily achieved without relying on any particular or unconventional processing techniques, though it will be appreciated that adequate size and volume fraction of precipitates are both important to preventing recrystallization.

High cycle fatigue (HCF) tests conducted at temperatures of about 650° C. (about 1200° F.) and about 980° C. (about 1800° F.) were performed on carburized and uncarburized specimens of the Rene N6 superalloy, all of which were coated with an identical aluminide coating. The results of both tests indicated no discernible difference in fatigue properties when tested under various conditions, including alternating stress levels of up to 60 ksi and for periods in excess of ten million cycles.

Environmental properties of Rene 162 specimens carburized in accordance with this invention were evaluated by a 880° C./1600 hour hot corrosion test with 5 ppm sea salt, and a cyclic hot corrosion-oxidation test whose test conditions were five minutes at 1075° C., ten minutes at 880° C., and 1 ppm sea salt in a Mach 0.3 gas stream. Again, the results indicated no difference in environmental properties of uncarburized specimens and specimens carburized in accordance with the invention.

Figure 1A:
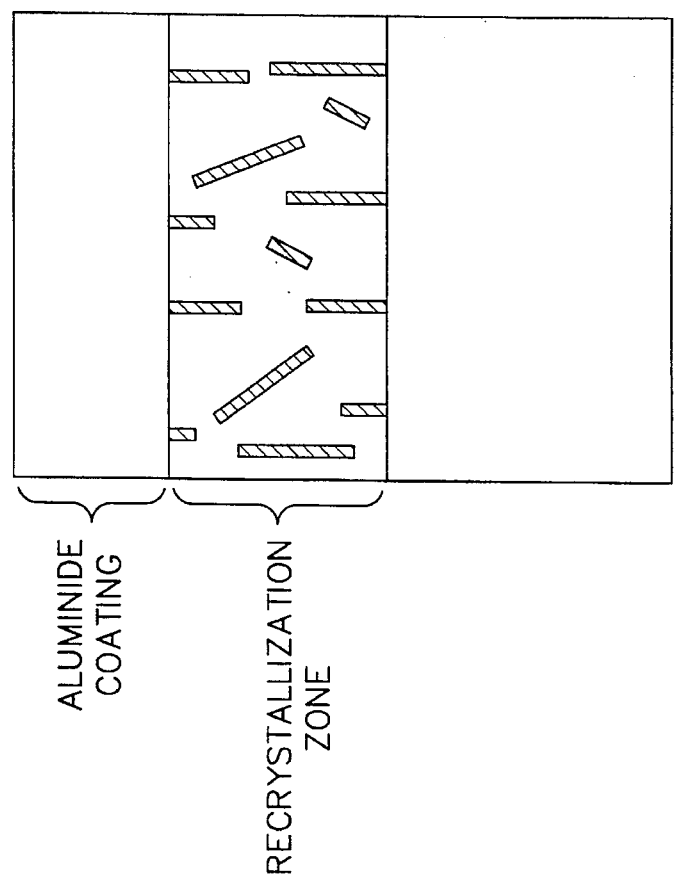

Finally, the ability of the method of this invention to prevent recrystallization of a superalloy component during high temperature brazing was confirmed visually, as represented in FIGS. 1A, 1B, 2A, 2B and 2C. With reference to FIGS. 1A and 1B, high pressure turbine blades for a gas turbine engine were formed from Rene 162. The blades were heavily grit blasted to remove approximately fifty micrometers of material, resulting in each blade having a cold worked region extending approximately 25 to 50 micrometers into its surface. Some of the blades were set aside as control specimens, while others were carburized in a vacuum atmosphere of methane and hydrogen for about one hour at about 1070° C. (about 1975° F.) to deposit and diffuse carbide precipitates to a depth of about 75 micrometers in the surfaces of the blades. All of the blades were then coated with a 50 to 75 micrometer-thick platinum aluminide layer in a conventional manner, and then exposed to a temperature of about 1090° C. (about 2000° F.) for a duration of about two hundred hours.

FIGS. 1A and 1B represent cross-sections of uncarburized and carburized blades, respectively, following completion of the test. Notably, recrystallization was clearly evident in a region just below the aluminide coating of the uncarburized blade, while recrystallization is completely absent in the carburized blade. Notably, though Rene 162 has a high rhenium content and is therefore susceptible to the formation of a secondary reaction zone (SRZ) under the conditions tested, SRZ was completely absent from the carburized blades though very prevalent in the uncarburized blades. As such, prevention of SRZ in the carburized blades was attributed solely to the presence of carbide precipitates within the surface of the carburized blades.

With reference to FIGS. 2A through 2C, a low pressure turbine blade for a gas turbine engine was formed from Rene N6, and then heavily grit blasted to remove approximately 25 micrometers of material, resulting in the blade having a cold worked region extending approximately 25 to 50 micrometers into its surface. The blade was then carburized according to the invention, and then coated with a 50 to 75 micrometer-thick platinum aluminide layer in a conventional manner. A diffusion zone melting point study was then performed on the blade, by which segments of the blade were sectioned and exposed for about one hour in air at temperatures of about 1260°, 1274°, 1288°, 1302°, 1316°, 1329°, 1336° and 1343° C. As before, no recrystallization occurred in the blade, as represented by the results of the 1302°, 1316° and 1329° C. tests shown in FIGS. 2A through 2C, respectively. Notably, results of the 1343° C. test illustrated the great effectiveness of carburization in the prevention of recrystallization at solution temperatures of a superalloy and temperatures approaching the melting temperature of a superalloy, which in this case is about 1349° C. for the Rene N6 alloy tested.

From the above results, it can be appreciated that the method of this invention enables superalloy components to be joined, repaired or otherwise heated to temperatures approaching the melting temperature of the superalloy without recrystallization. Accordingly, the method of this invention enables fabrication and repair of superalloy articles using braze materials whose melting temperatures are very near that of the superalloy to be brazed. Because mechanical properties of braze materials, such a creep strength, are a function of the melting temperature of the braze material, superalloy components fabricated or repaired in accordance with this invention are capable of exhibiting mechanical properties that are superior to that possible with prior art brazing methods.

Advantageously, other than permitting the use of higher temperature braze materials and braze temperatures, the method of this invention does not alter the brazing operation, but merely entails an additional step that can be performed before or after the cleaning operation. Accordingly, the method of this invention is compatible with conventional brazing methods, such that substantially conventional processing techniques can be employed to join or repair a component, such that implementation of the method of this invention has a minimal affect on the capital and processing costs for brazing superalloy components.

In addition to the above, a significant aspect of this invention is that the above advantages are achieved without adversely affecting the mechanical and environmental properties of a superalloy component. When appropriately limited to the surface regions of a superalloy component, the precipitates serve only to inhibit recrystallization while leaving undisturbed the interior areas of the component where recrystallization does not pose a problem during brazing. Finally, another significant aspect of this invention is that it can be incorporated with other processes practiced in the art, such as the use of aluminide coatings for preventing environmental corrosion and the use of thermal barrier coatings. As a result, a superalloy component fabricated or repaired in accordance with this invention is capable of being further processed in order to enhance its environmental properties over a wide range of temperatures.

While our invention has been described in terms of a preferred embodiment, it is apparent that other forms could be adopted by one skilled in the art. For example, the physical and composition properties of the braze material could vary considerably, other precipitates and superalloys could be employed, and brazing operations could be employed that differ substantially from those noted here. Therefore, the scope of our invention is to be limited only by the following claims.

The embodiments of the invention in which an exclusive property or privilege is claimed are defined as follows:

1. A method for processing a superalloy article, the method comprising the steps of:

providing a superalloy article having a surface;

introducing cold work into the superalloy article characterized by a cold work depth extending into the surface;

forming recrystallization-preventing precipitates in the surface, the precipitates being formed to a depth of at least the cold work depth; and heating the superalloy article such that the precipitates prevent recrystallization of the superalloy article at the surface.

2. A method as recited in claim 1 wherein the introducing step is a cleaning step performed with abrasive media to remove contaminants and oxides from the surface.

3. A method as recited in claim 1 wherein the introducing step occurs after the forming step and before the heating step.

4. A method as recited in claim 1 wherein the precipitates are chosen from the group consisting of carbides, borides, nitrides and oxides.

5. A method as recited in claim 1 wherein the precipitates are submicron in size.

6. A method as recited in claim 1 wherein the superalloy article has a rhenium content of at least about five weight percent, the precipitates further serving to prevent formation of a secondary reaction zone in the surface of the superalloy article.

7. A method as recited in claim 1 wherein the heating step is conducted at a solution temperature of the superalloy article.

8. A method as recited in claim 1 wherein the heating step is a brazing operation.

9. A method for joining corresponding surfaces of separate superalloy subcomponents to form a superalloy article, the method comprising the steps of:

forming the subcomponents from a superalloy;

cleaning the surfaces of the subcomponents such with abrasive media such that contaminants and oxides are removed from the surfaces, the cleaning step introducing cold work into the subcomponents characterized by a cold work depth extending into the surface of each subcomponent;

diffusing an element into the surface of each of the subcomponents so as to form recrystallization-preventing precipitates in the superalloy article to a depth of at least the cold work depth; and brazing the subcomponents together with a braze material so as to form the superalloy article, the precipitates preventing recrystallization at the surfaces of the subcomponents during the brazing step.

10. A method as recited in claim 9 wherein the precipitates are chosen from the group consisting of carbides, borides, nitrides and oxides.

11. A method as recited in claim 9 wherein the precipitates are submicron carbides.

12. A method as recited in claim 9 wherein the superalloy has a rhenium content of at least about five weight percent, the precipitates further serving to prevent formation of a secondary reaction zone in the surfaces of the subcomponents.

13. A method as recited in claim 9 wherein the brazing step is conducted at a solution temperature of the superalloy.

14. A method as recited in claim 9 wherein the diffusing step is performed prior to the cleaning step.

15. A method for repairing a superalloy article having a surface in which a crack is present, the method comprising the steps of:

treating the surface of the superalloy article such that contaminants and oxides are removed therefrom, the treating step introducing cold work into the superalloy article characterized by a cold work depth extending into the surface;

diffusing an element into the surface so as to form recrystallization-preventing precipitates in the superalloy article to a depth of at least the cold work depth; and brazing the superalloy article so as to substantially fill the crack, the precipitates preventing recrystallization at the surface of the superalloy article during the brazing step.

16. A method as recited in claim 15 wherein the precipitates are chosen from the group consisting of carbides, borides, nitrides and oxides.

17. A method as recited in claim 15 wherein the precipitates are submicron carbides.

18. A method as recited in claim 15 wherein the superalloy article has a rhenium content of at least about five weight percent, the precipitates further serving to prevent formation of a secondary reaction zone in the surface of the superalloy article.

19. A method as recited in claim 15 wherein the brazing step is conducted at a solution temperature of the superalloy article.

20. A method as recited in claim 15 wherein the diffusing step is performed prior to the treating step.

* * * * *